United States Patent [19]

Tabereaux

[11] 4,450,054
[45] May 22, 1984

[54] ALUMINA REDUCTION CELL

[75] Inventor: Alton T. Tabereaux, Sheffield, Ala.

[73] Assignee: Reynolds Metals Company, Richmond, Va.

[21] Appl. No.: 536,707

[22] Filed: Sep. 28, 1983

[51] Int. Cl.³ .......................... C25C 3/06; C25C 3/08; C25C 11/12

[52] U.S. Cl. ................................. 204/67; 204/64 R; 204/64 T; 204/65; 204/68; 204/70; 204/243 R; 204/243 M

[58] Field of Search ...................... 204/67, 64 R, 64 T, 204/65, 68, 70, 243 R, 243 M

[56] References Cited

U.S. PATENT DOCUMENTS

| | | | |
|---|---|---|---|
| 3,156,639 | 11/1964 | Kibby | 204/243 |
| 3,202,600 | 8/1965 | Ransley | 204/279 |
| 3,274,093 | 9/1966 | McMinn | 204/243 |
| 3,287,247 | 11/1966 | Dewey | 204/243 |
| 3,321,392 | 5/1967 | McMinn et al. | 204/243 |
| 3,960,678 | 6/1976 | Alder | 204/67 |
| 3,960,696 | 6/1976 | Wittner | 204/245 |
| 4,071,420 | 1/1978 | Foster et al. | 204/67 |
| 4,177,128 | 12/1979 | Rahn | 204/243 R |
| 4,181,583 | 1/1980 | Steiger et al. | 204/67 |
| 4,224,128 | 9/1980 | Walton | 204/243 R |
| 4,231,853 | 11/1980 | Rahn | 204/243 R |
| 4,265,717 | 5/1981 | Wiltzius | 204/67 |
| 4,349,427 | 9/1982 | Goodman et al. | 204/243 R |
| 4,354,918 | 10/1982 | Boxall et al. | 204/67 |
| 4,376,690 | 3/1983 | Kugler | 204/243 |

Primary Examiner—Arthur P. Demers
Attorney, Agent, or Firm—Alan T. McDonald

[57] ABSTRACT

An improved alumina reduction cell is described in which the carbonaceous cathode includes refractory hard metal tiles projecting upwardly from the cell surface thereof, forming the true cathode surface and inert refractory sleeves imbedded in the cathode into which the refractory hard tiles are mounted.

5 Claims, 1 Drawing Figure

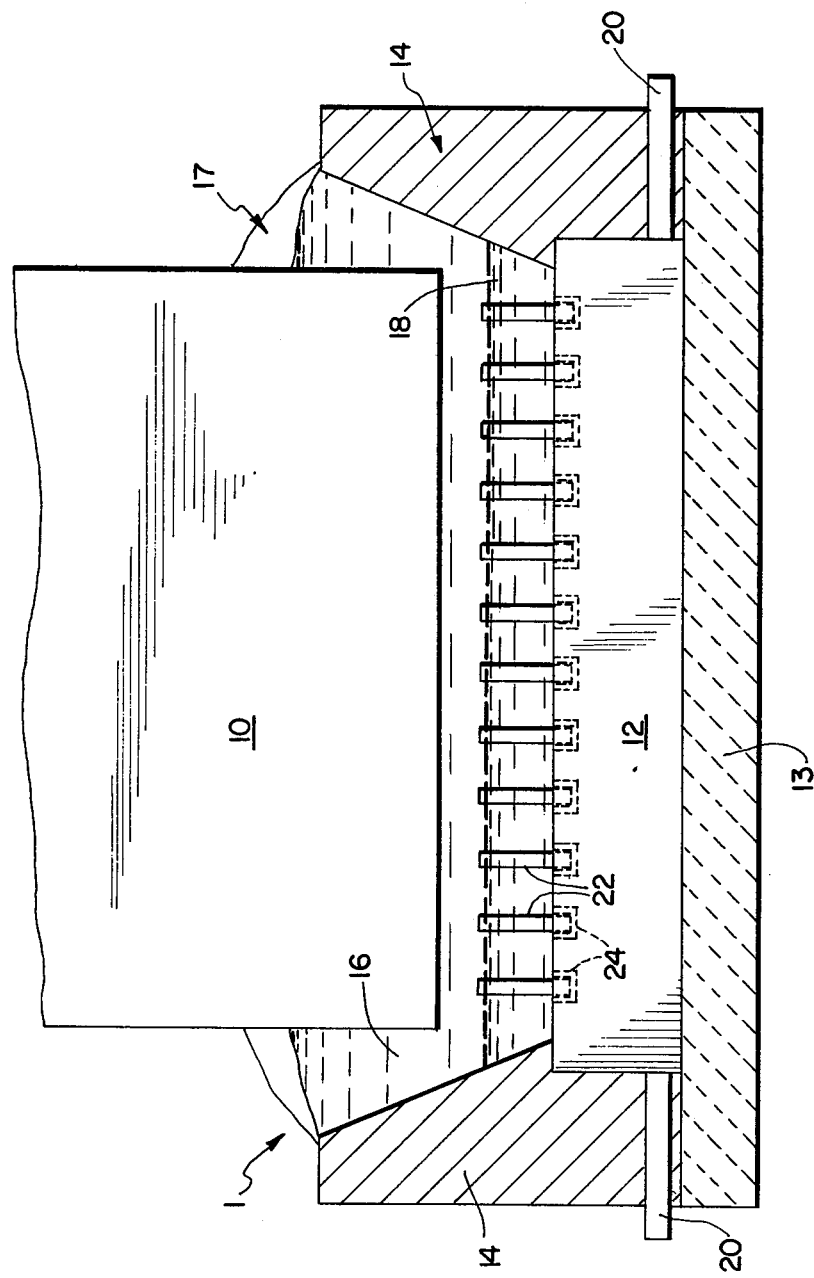

ALUMINA REDUCTION CELL

BACKGROUND OF THE INVENTION

Aluminum metal is conventionally produced by the electrolytic reduction of alumina dissolved in a molten cryolite bath according to Hall-Heroult process.

This process for reducing alumina is carried out in a thermally insulated cell or "pot" which contains the alumina-cryolite bath. The cell floor, typically made of a carbonaceous material, overlies some of the thermal insulation for the cell and serves as a part of the cathode. The cell floor may be made up of a number of carbonaceous blocks bonded together with a carbonaceous cement, or it may be formed using a rammed mixture of finely ground carbonaceous material and pitch. The anode, which usually comprises one or more carbonaceous blocks, is suspended above the cell floor. Resting on the cell floor is a layer or "pad" of molten aluminum which the bath sees as the true cathode. The anode, which projects down into the bath, is normally spaced from the pad at a distance of about 1.5 to 3.0 inches (3.81 to 7.61 centimeters). The alumina-cryolite bath is maintained on top of the pad at a depth of about 6.0 to 12.0 inches (15.24 to 30.48 centimeters).

As the bath is traversed by electric current, alumina is reduced to aluminum at the cathode and carbon is oxidized to its dioxide at the anode. The aluminum thus produced is deposited on the pad and tapped off periodically after it has accumulated.

For the electrolytic process to proceed efficiently, the alumina reduction should occur onto a cathode surface of aluminum and not the bare carbonaceous surface of the cell floor. Therefore, it is considered important for the pad to cover the cell floor completely.

As molten aluminum does not readily wet or spread thinly on carbonaceous materials, the pad can best be visualized as a massive globule on the cell floor. In larger cells, the dense currents of electrolysis give rise to powerful magnetic fields, sometimes causing the pad to be violently stirred and to be piled up in selected areas within the cell. Therefore, the pad must be thick enough so that its movements do not expose the bare surface of the cell floor. Additionally, the anode must be sufficiently spaced from the pad to avoid short circuiting and to minimize reoxidation of aluminum.

Still, the movements of the paid have adverse effects which cannot always be readily controlled. For a given cell operating with a particular current of electrolysis, there is an ideal working distance between the cathode and the anode for which the process will be most energy efficient. However, the required spacing of the anode due to turbulence of the paid prevents this ideal working distance from being constantly maintained. Further, since the pad is in a state of movement, a variable, nonuniform working distance is presented. This variable interelectrode distance can cause uneven wear or consumption of the anode. Pad turbulence can also cause an increase in back reaction or reoxidation at the anode of cathodic produces, which lowers cell efficiency. In addition, pad turbulence leads to accelerated bottom liner distortion and degradation through thermal effects and through penetration by the cryolite and its constituents.

It has been suggested in the literature and prior patents that certain special materials, such as refractory hard metals (RHM), most notably titanium diboride ($TiB_2$) or its homologs, can be used advantageously in forming the cell floor. Further, it has been found that RHM tile materials may be embedded into the cell floor, rising vertically through the molten aluminum layer and into the cryolite-alumina bath, with the uppermost ends of these tiles forming the true cathode. When such a cathode design is employed, precise spacing between the true or active surfaces of the cathode and the anode may be maintained, since such a system is not affected by the ever-moving molten aluminum pad acting as the true cathode surface.

Ideally, in contrast to conventional carbon products, these RHM materials are chemically compatible with the electrolytic bath at the high temperatures of cell operation and are also comparable chemically with molten aluminum.

Furthermore, the special cell floor materials are wetted by molten aluminum. Accordingly, the usual thick metal pad should no longer be required, and molten aluminum may be maintained on the cell floor as a relatively thin layer and commensurate with amounts accumulating between the normal tapping schedule.

With all their benefits to the reduction process, there is a problem associated with the use of RHM tiles as vertically projecting members into the alumina-cryolite bath. When attached to carbonaceous substrates, such as the carbonaceous cathode of a reduction cell, erosion occurs at the RHM tile-carbonaceous substrate interface in the presence of molten aluminum and electrolyte. It is believed that this erosion is primarily chemical in nature, with the molten aluminum wetting the tile surface and reacting with the carbon to form $Al_4C_3$, which then dissolves in the electrolyte. This sets up a mechanism for removal of carbon from the tile interface and below, causing detachment of the cathodic tiles from the carbonaceous substrate.

Previous patents dealing with the elimination of the RHM tile-carbonaceous substrate interface include U.S. Pat. Nos. 4,349,427 and 4,376,690. In U.S. Pat. No. 4,349,427, a removable tray structure is described which is formed from a refractory material, such as silicon carbide, which contains refractory hard metal shapes or pieces therein. In U.S. Pat. No. 4,376,690, silicon carbide shapes are mounted to the bottom of RHM tiles, with the silicon carbide shapes being designed to slip into place in or above the carbonaceous substrate.

Both of these patents require complex and expensive physical structures to produce. Thus, these structures have not gained widespread acceptance in production.

It is thus a primary object of the present invention to avert the cause of the RHM-carbonaceous substrate reaction while maintaining the advantages of the wetted RHM cathode and electrical connection to a practical substrate for the active cathode and without the need for complex and expensive physical structures.

THE PRESENT INVENTION

By means of the present invention, the above-stated objectives have been obtained. According to the present invention, inert refractory sleeves are imbedded into the carbonaceous substrate. These sleeves provide supports for the RHM tiles, which tiles are then slipped into the sleeves. The refractory sleeves eliminate the RHM-carbonaceous substrate interface, thus preventing the previously-mentioned RHM-carbonaceous substrate reaction from occurring. At the same time, the sleeves provide a simple mechanism for RHM tile removal and replacement during cell production, thus substantially reducing down time required for refitting.

BRIEF DESCRIPTION OF THE DRAWING

The alumina reduction cell of the present invention will be more fully described with reference to the drawing in which:

The FIGURE is a side elevational view of an alumina reduction cell, with the end wall removed, according to the practice of the present invention.

DETAILED DESCRIPTION OF THE PREFERRED EMBODIMENT

The FIGURE illustrates an alumina reduction cell 1 employing the present invention. Anode blocks 10, formed from a carbonaceous material, are suspended within a bath 16 of alumina dissolved in molten cryolite and are attached to a source of electrical current by means not shown. A crust 17 of frozen cryolite-alumina covers the bath 16. Carbaneceous cathode blocks 12 may be joined together by a rammed mixture of pitch and ground carbanaceous material or by means of a carbonaceous cement, by means well known to those skilled in the art. These cathode blocks 12 are connected by means of conductor bus bars 20 to the electrical current source to complete the electrical circuit. Outer walls 14 form the side and end supporting structures for the cell 1. The walls 14 may be formed, for example, from graphite blocks held together with a graphitic cement.

The carbonaceous blocks 12 include a plurality of tiles 22, which tiles project upwardly into the molten cryolite-alumina bath 16 and form the actual cathode surface for the cell 1. The tiles 22 are refractory hard metal (RHM) tiles, which may be formed of such materials as $TiB_2$, $TiB_2$-AlN mixtures, and other similar materials well-known to these in the art, typically by hot pressing or sintering RHM powders to form the shapes. These refractory hard metal materials are wetted by molten aluminum, where they pass through the molten aluminum layer 18, preventing globules of molten aluminum from forming at the interfaces with the tiles 22 and reducing movement of the molten aluminum pad 18.

To minimize cracking during use of these tiles, due to the brittleness of the RHM materials, the RHM tiles 22 may be reinforced with carbon, graphite or silicon carbide fibers or particles, which are added to the powders forming these tiles 22 prior to hot pressing or sintering. When fibers are employed, the fibers may be random or uniform in length and are oriented in the plane perpendicular to the direction of hot pressing. The fibers or particles act to resist tensile stresses that could result in cracking during use.

According to the practice of the present invention, the tiles 22 are not directly attached to the carbonaceous substrate 12. Sleeves or liners 24 are imbedded into the carbonaceous substrate 12. Preferably, the sleeves 22 do not extend above the surface of carbonaceous substrate 12. These sleeves 24 are formed from a refractory material, which refractory material is inert to molten aluminum. The liners 24 may be cemented into holes formed in carbonaceous substrate 12, such as by a carbonaceous cement, or may be formed integrally with the formation of the carbonaceous substrate 12. The sleeves 24 are formed from such refractory materials as silicon carbide, silicon nitride, aluminum nitride and boron nitride. The preferred material for the sleeves 24 is a silicon nitride bonded silicon carbide.

The sleeves 24 are shaped to permit the tiles 22 to be inserted therein, but the tiles 22 are not fixed into sleeves 24. Thus, if the tiles 22 are rectangular tiles, the sleeves 24 will include a rectangular opening therein to permit the tiles 22 to be fitted into the sleeves 24. Similarly, if the tiles 22 are in the form of rods, the sleeves 24 may be in the form of cylinders.

Since the tiles 22 are not fixed into the sleeves 24, they may be readily removed and replaced during the production of the cell, such as during an anode change. This ability to "hot change" the tiles 22 assures that should one or more tiles 22 become broken, they may be readily replaced, eliminating the need for a complete shutdown of the cell 1 for corrective action.

Since the sleeves 24 are inert, they do not conduct electricity from the tiles 22 to the carbonaceous substrate 12. The circuit remains complete, however, by means of the molten aluminum pad 18, which pad 18 conducts electricity from tiles 22 to the carbonaceous substrate 12.

From the foregoing, it is clear that the present invention provides a simple, yet effective, means for preventing erosion at an RHM-carbonaceous interface within an alumina reduction cell.

While presently preferred embodiments of the invention have been illustrated and described, it is clear that the invention may be otherwise variously embodied and practiced within the scope of the accompanying claims.

I claim:

1. In an alumina reduction cell having an anode, a carbonaceous cathode forming the floor of said cell and a plurality of refractory hard metal (RHM) shapes extending vertically upwardly from said carbonaceous cathode the improvement comprising inert refractory sleeves imbedded in said carbonaceous cathode, said RHM shapes being mounted within said sleeves without being affixed thereto to thereby eliminate any RHM-carbonaceous material interface and to permit removal and replacement of said RHM shapes during operation of said cell.

2. The cell of claim 1 wherein said RHM shapes are formed from a material selected from the group consisting of titanium diboride and titanium diboride-aluminum nitride mixtures.

3. The cell of claim 1 wherein said RHM shapes are fiber reinforced.

4. The cell of claim 1 wherein said inert refractory sleeves are formed from a material selected from the group consisting of silicon carbide, silicon nitride, aluminum nitride and boron nitride.

5. The cell of claim 4 wherein said inert refractory sleeves are formed from silicon nitride bonded silicon carbide.

* * * * *